US007664885B2

(12) United States Patent
Carapelli

(10) Patent No.: US 7,664,885 B2
(45) Date of Patent: Feb. 16, 2010

(54) COMMUNICATION SYSTEM WITH AUTOMATIC CONFIGURATION OF THE COMMUNICATION INTERFACE

(76) Inventor: Giovanni Carapelli, Via L. Andreotti, 73, 50142 Firenze (IT)

( * ) Notice: Subject to any disclaimer, the term of this patent is extended or adjusted under 35 U.S.C. 154(b) by 124 days.

(21) Appl. No.: 10/363,059

(22) PCT Filed: Aug. 24, 2001

(86) PCT No.: PCT/IB01/01853

§ 371 (c)(1), (2), (4) Date: Oct. 9, 2003

(87) PCT Pub. No.: WO02/19631

PCT Pub. Date: Mar. 7, 2002

(65) Prior Publication Data

US 2004/0054816 A1 Mar. 18, 2004

(30) Foreign Application Priority Data

Jan. 9, 2000 (EP) ................................. 00118955

(51) Int. Cl.
*G06F 15/177* (2006.01)
*G06F 15/16* (2006.01)
*G06F 3/00* (2006.01)
*G06F 13/00* (2006.01)

(52) U.S. Cl. .......................... 710/8; 709/220; 709/228; 719/327

(58) Field of Classification Search ......... 709/220-222, 709/227-229; 710/1, 8; 717/168, 171-173, 717/174, 176-178; 719/321, 327
See application file for complete search history.

(56) References Cited

U.S. PATENT DOCUMENTS

| | | | | |
|---|---|---|---|---|
| 5,717,955 | A * | 2/1998 | Swinehart | 710/62 |
| 5,952,638 | A | 9/1999 | Demers et al. | |
| 6,098,879 | A * | 8/2000 | Terranova | 235/384 |
| 6,259,432 | B1 * | 7/2001 | Yamada et al. | 345/159 |
| 6,446,111 | B1 | 9/2002 | Lowery | |

(Continued)

FOREIGN PATENT DOCUMENTS

| | | | |
|---|---|---|---|
| EP | 0 780 802 | A2 | 6/1997 |
| EP | 1024463 | | 8/2000 |
| EP | 1024463 | A2 * | 8/2000 |
| WO | WO 97/45814 | A | 12/1997 |

(Continued)

OTHER PUBLICATIONS

Jaap C. Haartsen; The Bluetooth Radio System; Feb. 2000; IEEE Personal Communications—Feb. 2000; pp. 28-36.*

(Continued)

*Primary Examiner*—Niketa Patel
*Assistant Examiner*—Richard Franklin
(74) *Attorney, Agent, or Firm*—Sterne Kessler Goldstein & Fox, P.L.L.C.

(57) ABSTRACT

The present invention provides a communication system comprising a Master unit (1) and at least one Client unit (3), means to automatically establish a wireless bi-directional connection between said Client unit and said Master unit when they are close together; and means to automatically configure a communication interface (5) between said Master unit and said Client unit after connection is established. The invention thus enables systems with different protocols to find and communicate via said configured communication interface (5).

29 Claims, 2 Drawing Sheets

U.S. PATENT DOCUMENTS

| | | | | |
|---|---|---|---|---|
| 6,526,335 | B1 | 2/2003 | Treyz et al. | |
| 6,535,726 | B1 | 3/2003 | Johnson | |
| 6,574,603 | B1 | 6/2003 | Dickson et al. | |
| 6,772,420 | B1 * | 8/2004 | Poger et al. | 719/327 |
| 6,968,365 | B2 | 11/2005 | Hollstrom et al. | |
| 7,257,426 | B1 | 8/2007 | Witkowski et al. | |
| 2002/0032573 | A1 | 3/2002 | Williams et al. | |
| 2002/0099608 | A1 | 7/2002 | Pons et al. | |
| 2003/0055735 | A1 | 3/2003 | Cameron et al. | |
| 2003/0061170 | A1 | 3/2003 | Uzo | |
| 2004/0054601 | A1 | 3/2004 | Carapelli | |
| 2005/0017068 | A1 | 1/2005 | Zalewski et al. | |

FOREIGN PATENT DOCUMENTS

| | | | |
|---|---|---|---|
| WO | WO 98/54678 | A | 12/1998 |
| WO | WO 99/22346 | A | 5/1999 |
| WO | WO 99/41717 | A | 8/1999 |
| WO | WO 00/04476 | A | 1/2000 |

OTHER PUBLICATIONS

The Jini Architecture Specification; Jan. 1999; Sun Microsystems, Inc.; Version 1.0; pp. 1-11.*

The Jini Lookip Service Specification; Jan. 1999; Sun Microsystems, Inc.; Version 1.0; pp. 1-8.*

The Jini™ Device Architecture Specification (DA); Jan. 1999; Sun Microsystems, Inc.; Version 1.0; pp. 1-7.*

The Jini Device Architecture Specification (DA); Jan. 1999; Sun Microsystems, Inc.; Version 1.0; pp. 1-7.*

Haartsen J: "Bluetooth—The Universal Radio Interface for AD HOC, Wireless Conectivity" Ericsson Review, Ericsson. Stockholm, SE, No. 9, 1998, pp. 110-117, XP000783249 ISSN: 0014-0171.

English language Abstract for Japanese Patent Publication No. JP H08-249530, published Sep. 27, 1996.

English language Abstract for Japanese Patent Publication No. JP H04-253695, published Sep. 9, 1992.

"Israel: Vending Machine Links with Phone or PC", Jerusalem Post, Jul. 4, 1999, p. 10. [recovered from Dialog on Mar. 26, 2008].

"Move Over E-commerce, Here Comes M-commerce.(mobile commerce)(Brief Article)Statistical Data Included)", The Food Institute Report, vol. 73, p. N/A, Mar. 13, 2000.[recovered from Dialog on Mar. 26, 2008].

Kujubu, Laura, Phones used for cashless buys.(TeleVend Vending Automation System Technologies)(Company Business and Marketing), InfoWorld, vol. 21 (29), p. 16, Jul. 19, 1999. [recovered from Dialog on Mar. 26, 2008].

Reid, Keith, "Net Profits at the Pump? (Brief Article)", National Petroleum News, vol. 92 (1), p. 38, Jan. 2000. [recovered from Dialog on Mar. 26, 2008].

Hafner, Katie, "Want a Soda? Phone it in mobile commerce could turn your wireless phone into an electronic wallet for all kinds of purchases", The New York Times. Sun Sentinel, Ft. Lauderdale: Mar. 12, 2000, p. 3F. [recovered from Proquest database on Jul. 21, 2006].

Kujubu, Laura., "Phones used for cashless buys", Infoworld, San Mateo, Jul. 19, 1999, vol. 21 (29), p. 16. [recovered from Proquest database on Jul. 21, 2006].

Ringle, Ken, "The Sell Phone Dial 'M' for Munchies", The Washington Post, Washington D.C., Jun. 19, 1999. [recovered from Proquest database on Jul. 21, 2006].

International Search Report issued in Int'l Patent Application No. PCT/IB2001/001853 on Dec. 20, 2001, 3 pages.

International Search Report issued in Int'l Patent Application No. PCT/IB2001/001841 on Jan. 3, 2002, 3 pages.

Notice of Allowance in U.S. Appl. No. 10/363,060, mailed Dec. 23, 2008.

Supplemental Notice of Allowability in U.S. Appl. No. 10/363,060, mailed Feb. 3, 2009.

* cited by examiner

COMMUNICATION SYSTEM WITH AUTOMATIC CONFIGURATION OF THE COMMUNICATION INTERFACE

PRIOR APPLICATION DATA

The present application is a national phase application of International Application Serial No. PCT/IB01/01841, filed Aug. 24, 2001, published as WO 02/19631, on Mar. 7, 2002, entitled "COMMUNICATION SYSTEM WITH AUTOMATIC CONFIGURATION OF THE COMMUNICATION INTERFACE", which in turn claims the benefit of European Application Serial No. 00118955.4, filed Sep. 1, 2000.

FIELD OF THE INVENTION

The present invention relates to a communication system permitting a person having a communicator to connect and to communicate with other devices such as retailer point of sale devices, vending machines or service providers.

More specifically, the present invention is directed to a communication system for users having mobile wireless communicators such as mobile phones.

BACKGROUND OF THE INVENTION

With present communication systems there are some drawbacks due to the fact that communication is necessarily restricted to users having communicators which are configured to exchange data according to a predetermined communication common protocol. For example, cellular network communication systems allow a certain number of subscribers to communicate with each other when they are inside a predetermine region "covered" by the same network.

A first solution to that problem has been provided for by creating "standard" communication system to which most of the mobile phones comply. However, even these "standard" systems, for example the GSM cellular system, are strictly limited to certain types of use mobile communicators such as cellular phones, and do not permit a user to go beyond predetermined regions, or devices.

These problems represent a big obstacle for a world-wide "universal" use of mobile communicators, which may be of different types, such as lap tops, personal digital assistants, mobile phones and the like which can not, at present, communicate with other communication devices wherever located and based on whatever communicating protocol.

In particular, there is a need for a communication system permitting vending apparatus to be joined to users having mobile communicators of different types without specific configuration procedures having to be implemented beforehand.

SUMMARY

An aim of the invention is to provide a communication system permitting a mobile communicator of a user, and specifically of a purchaser, to have an "universal" use regardless of the type of communicator, communication protocol and the geographic location of the communication device.

Another aim of the invention is to provide a system, particularly a complex vending system, which can be easily upgraded and supplemented with apparatus additional to that originally fitted or intended to be fitted.

According to the present invention there is provided a communication system comprising a Master unit and at least one Client unit characterised in that the system further comprises means to automatically establish a wireless bi-directional connection between said Client unit and said Master unit when they are within close proximity to each other and means to automatically configure a communication interface between said Master unit and said Client unit after connection is established.

By employing the present invention an interface may be configured in accordance with the protocol of either of the Master unit or the Client unit such that different Client units of different types and using different protocols may be used with a common Master unit, for example a fuel dispenser may interact with different types of mobile communicators, such as mobile phones on different networks or personal digital assistants and the like.

Preferably the means to automatically establish a wireless bi-directional connection between said Client unit and said Master unit consists of a radio frequency bi-directional interface provided at the Master unit and to the Client unit.

Advantageously, the means to automatically configure a communication interface between the Master unit and Client unit comprises driver software provided at the Master unit and at the Client unit which is respectively transmitted to the Master unit and to the Client unit in order to automatically configure a communication interface between said master and Client units. In this manner the driver circuitry can reconfigure the appropriate interface in accordance with information received from the initial wireless connection.

Preferably the system further comprises at least one Service Provider unit connected to said Master unit and means to automatically configure a communication interface between said Client unit and said Service Provider unit, said master, client and Service Provider units being able to be connected through a network. This feature of the invention not only enables a Client unit to be configured to the Master unit but also to a remote Service Provider unit,

BRIEF DESCRIPTION OF THE DRAWINGS

One embodiment of the present invention will now be described by way of example only with reference to the accompanying drawings of which.

DETAILED DESCRIPTION OF THE INVENTION

Figure 1:
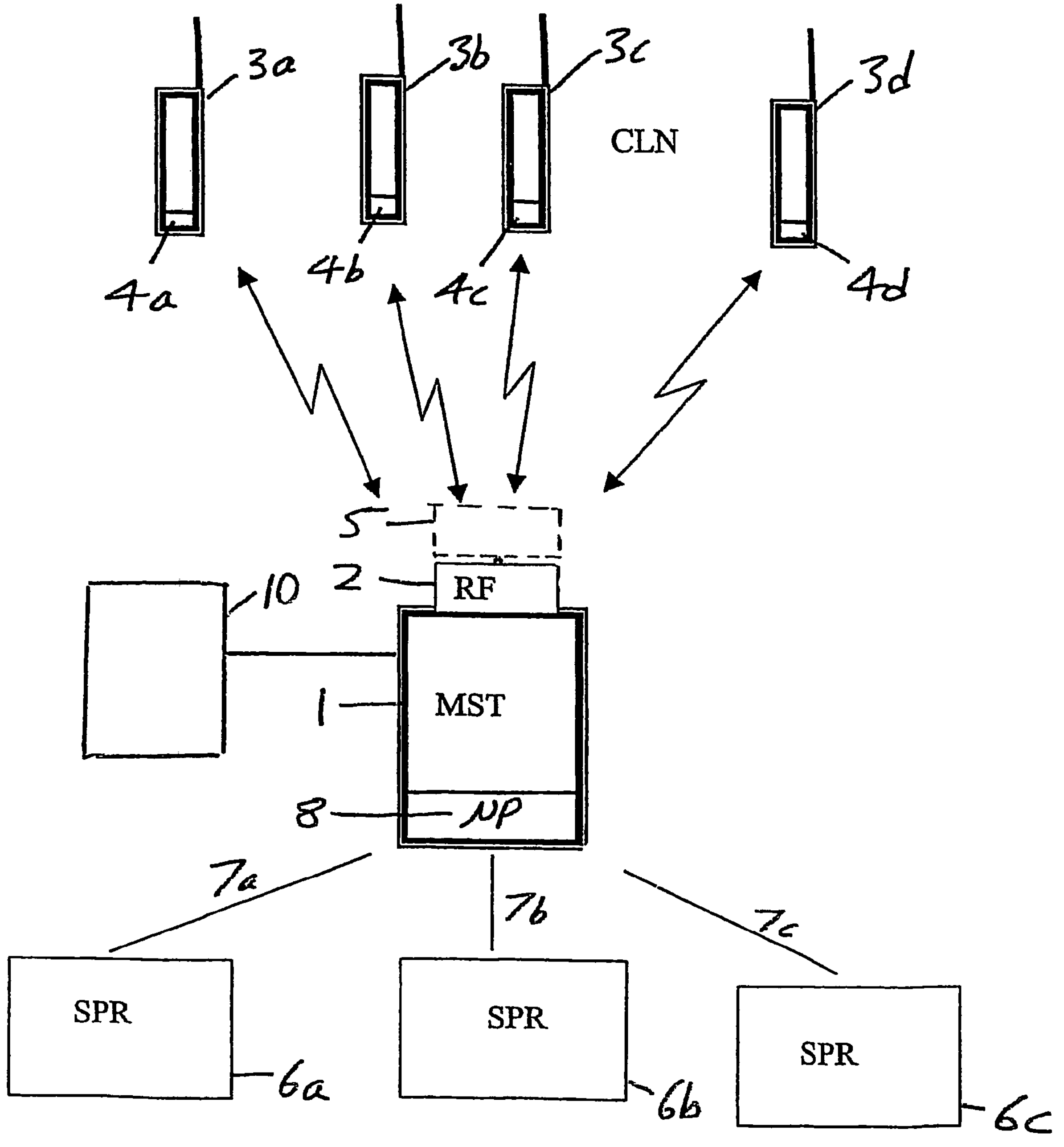
FIG. 1 is a schematic diagram of a communication system according to the invention.

Referring to FIG. 1 a master (MST) unit 1 has a radio frequency RF interface 2 able to automatically establish a wireless bi-directional connection with a corresponding RF interface 4*a* to 4*d* of one of a Client units 3*a* to 3*d* when the latter are located in the vicinity of the Master unit 1. Each of the interfaces 4*a* to 4*d* together with interface 2 and associated software, effectively form a communication interface illustrated schematically as 5. Said RF interfaces may be Bluetooth™ enabled interfaces, and the Master unit 1 is typically a central processor of a vending system such as the controller of a fuel dispensing system.

The communicators system further comprises a number of Service Provider units (SPR) 6*a* and 6*c*. Each could be a fuel dispenser, drinks dispenser or similar such vending device that does not require an operator, but alternatively could be a point of sale system, such as may be located at a restaurant or store check out. Each service provider unit 6*a* to 6*c* is connected to the MST 1 by a RF connection 7*a* to 7*c* respectively or by other suitable communication interface, for example by a conventional cable connection.

The Master unit MST 1 is a controller unit of a local network, for example a network of vending machines and other Service Providers of a vending system, and the Client unit CLN is a mobile communicator of a user of the system, for example of a purchaser in the vicinity of the vending machine which purchaser is already connected to the MST by the above identified RF interface.

The Master 1, Client 4a to 4c, and Service Provider, 6a to 6c, units are controlled by a microprocessor unit 8 in the Master unit running an operating system with a layer structured architecture and they are each connected through a local network.

Figure 2:
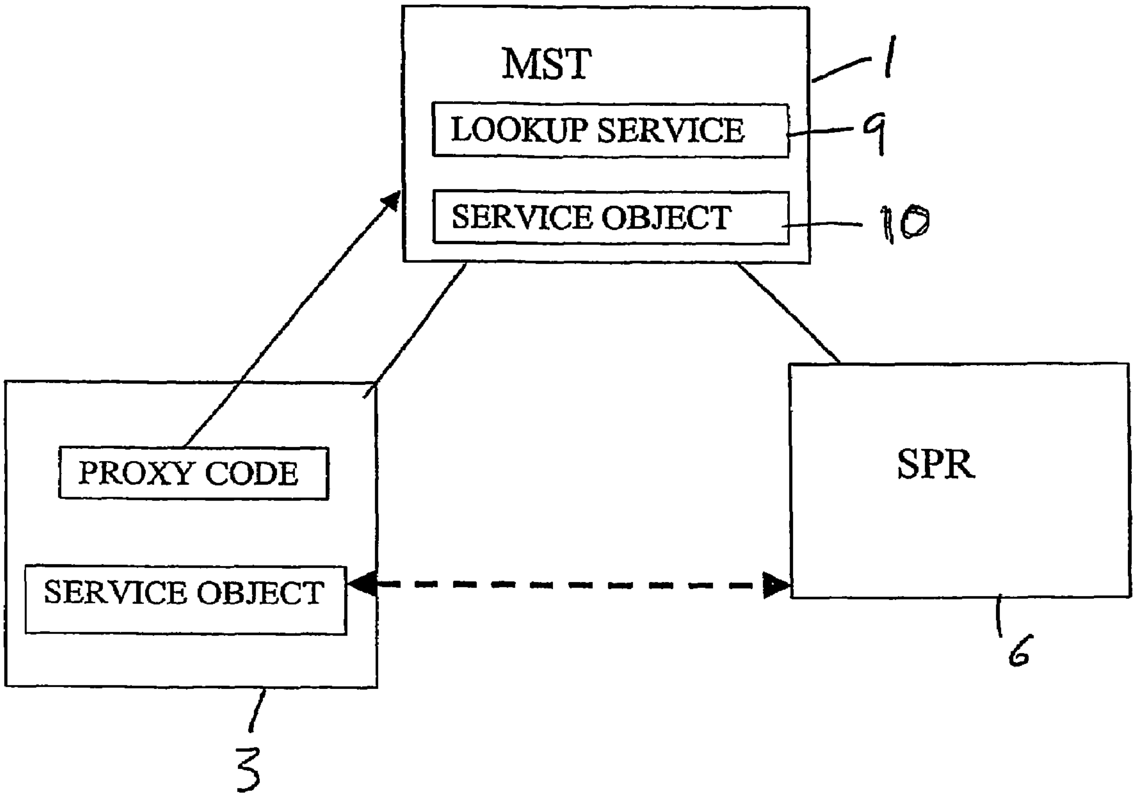
FIG. 2 illustrates the general architecture of the system of FIG. 1.

As illustrated with reference to FIG. 2, an operating system of the microprocessor 8 comprises:

- a communication infrastructure layer; able to provide the system of the connectivity function and the communication protocols of the network;
- a discovery and lookup layer 9 able to discover, register and to make available the system resources; and
- a service layer 10 where driver software of the Service Providers including all the features and attributes of the service and the proxy object of the service is loaded.

As illustrated with reference to FIG. 2, when a client approaches the Master unit 1, the Client unit 3 is automatically connected to the Master unit via respective interfaces 2 and 4 and can request a service.

To achieve this the Client unit interface 4a to 4b joins the discovery service of Master unit 1, transmitting the driver software of the Client unit, including its proxy code, and a service request.

Through the discovery software the system resources finds out that a service has been requested and where the corresponding resource is present in the system, it is made available to the client through the lookup software 9.

The "lookup" layer of the Master unit 1 registers the availability in the system of the requested service, associates it to all the necessary driver software loaded in the service layer, and sends a copy of the requested service object to the Client unit 3 comprising the proxy codes of the requested services, so that the latter can interact directly with the Service Provider SPR via the downloaded service object. Preferably the system units are connected through a TCP/IP protocol enabled network and the proxy codes include an IP address of the corresponding service or Client unit.

In a preferred embodiment of the invention said operating system is a JAVA™ operating system and said architecture is a JINI™ based layer architecture. Advantageously, the system of the invention is able to be supplemented of any type of device or service by simply providing the Master unit with the driver software corresponding to that service or device.

At the same time, the Client units 3a to 3d the system can communicate with each other provided that their driver software is loaded into the service layer of a Master unit 1.

Furthermore "upgrading" of the system can be remotely controlled by a controller 10 connected with the Master unit 1, for example via the internet, and able to transmit to the Master unit 1 the required driver software.

The present invention has been described with reference to preferred embodiments, however, equivalent modifications can be made within the scope of the appended claims.

The invention claimed is:

1. A communication system comprising:

a Master unit configured to automatically establish a wireless bi-directional communications connection between said Master unit and an external Client unit, wherein said Master unit further is configured to receive, using the wireless bi-directional communications connection, driver software of the external Client unit and a request for a service from the external Client unit, wherein said Master unit, in response to receiving the request for a service from the external Client unit, further is configured to:

automatically associate the request for a service to a Service Provider unit associated with said Master unit and corresponding to the request for a service;

automatically establish between said Master unit and the external Client unit, over the wireless bi-directional communications connection, an application interface associated to the driver software of the external Client unit; and automatically transmit a service object of the Service Provider unit to the external Client unit using the application interface over the wireless bi-directional communications connection.

2. The system according to claim 1, wherein said Master unit is configured to automatically establish-a radio frequency (RF) bi-directional interface between said Master unit and said external Client unit.

3. The system according to claim 1, wherein said Master unit further is configured to automatically configure the application interface between said Master unit and said external Client unit using driver software provided at said Master unit and at said external Client unit and respectively transmitted to said Master unit and to said external Client unit.

4. The system according to claim 3, wherein said driver software provided at said Master unit comprises discovery and lookup software configured to discover, join and make available to each other said Master unit and said external Client unit.

5. The System according to claim 1, further comprising at least one Service Provider unit connected to said Master unit, wherein said Master unit further is configured to automatically configure an application interface between said external Client unit and said at least one Service Provider unit.

6. The system according to claim 5, further comprising:

driver software of the Service Provider unit provided at said Master unit, wherein said Master unit further is configured to:

associate said driver software of the external Client unit and said driver software of the Service Provider unit; and automatically configure between said external Client unit and said Service Provider unit an application interface associated to the driver software of the external Client unit and the driver software of the Service Provider unit.

7. The system according to claim 6, wherein said driver software of the external Client unit comprises a proxy code of the external Client unit and said driver software of the Service Provider unit comprises a proxy code of the Service Provider unit.

8. The system according to claim 7, wherein said Master unit further is configured to associate said driver software of the external Client unit and said driver software of the Service Provider unit using discovery and lookup software configured to discover, join and make available to each other said external Client unit and said Service Provider unit.

9. The system according to claim 8, wherein said driver software of said Service Provider unit is downloaded by said Master unit from a remotely located controller.

10. The system according to claim 9, wherein said controller is coupled to a public data communications network.

11. The system according to claim 5, wherein the Master unit, external Client unit and Service Provider unit are coupled through a TCP/IP enabled network.

12. The system according to claim 11, wherein said Master unit controls a vending system, and said external Client unit is a mobile communicator.

13. The system according to claim 1, wherein said Master unit automatically establishes the wireless bi-directional communications connection in response to location of the external Client unit within a proximity of said Master unit.

14. A method for providing wireless communications services, comprising:

automatically establishing at a Master unit a wireless bi-directional communications connection between the Master unit and an external Client unit;

receiving at the Master unit, using the wireless bi-directional communications connection, a request for a service from the external Client unit; and in response to receiving the request for a service at the Master unit:

automatically associating, at the Master unit, the request for a service to a Service Provider unit associated with the Master unit and corresponding to the request for a service;

automatically establishing at the Master unit, over the wireless bi-directional communications connection, an application interface associated to driver software of the external Client unit; and automatically transmitting from the Master unit to the external Client unit a service object of the Service Provider unit using the application interface over the wireless bi-directional communications connection.

15. The method of claim 14, wherein said automatically establishing an application interface comprises:

receiving the request for a service and the driver software of the external Client unit using the wireless bi-directional communications connection.

16. The method of claim 14, further comprising:

receiving at the Master unit, over the wireless bi-directional communications connection, the driver software of the external Client unit, a proxy code of the external Client unit, and the request for a service from the external Client unit.

17. The method of claim 14, further comprising:

associating the request for a service with a service object of the Service Provider unit.

18. The method of claim 14, further comprising:

automatically establishing the wireless bi-directional communications connection in response to location of the external Client unit within a proximity of the Master unit.

19. The method of claim 14, wherein transmitting the service object comprises:

transmitting a proxy code of the Service Provider unit associated with the service object.

20. The method of claim 19, wherein the proxy code includes an IP address of the Service Provider unit.

21. A computer readable storage medium having stored thereon computer executable instructions that, if executed by a computing device, cause the computing device to perform a method comprising:

configuring at a Master unit a wireless bi-directional communications connection between the Master unit and an external Client unit;

receiving at the Master unit a request for a service from the external Client unit; and in response to receipt of the request for a service at the Master unit:

automatically associating, at the Master unit, the request for a service to a Service Provider unit associated with the Master unit and corresponding to the request for a service;

automatically establishing at the Master unit an application interface associated to driver software of the external Client unit; and transmitting from the Master unit to the external Client unit a service object of the Service Provider unit via the application interface over the wireless bi-directional communications connection.

22. The computer readable storage medium of claim 21, the method further comprising:

automatically configuring the wireless bi-directional communications connection in response to location of the external Client unit within a proximity of the Master unit.

23. The computer readable storage medium of claim 21, the method further comprising:

associating the request for a service with a service object of the Service Provider unit.

24. The computer readable storage medium of claim 21, wherein the service object includes a proxy code of the Service Provider unit associated with the request for a service.

25. A communications system comprising:

a Client unit, configured to:

automatically establish a wireless bi-directional communications connection between said Client unit and an external Master unit;

transmit driver software of said Client unit and a request for a service to the external Master unit, over the wireless bi-directional communications connection, thereby enabling the external Master unit to associate the request for a service to an external Service Provider unit associated with the external Master unit, and configure an application interface associated to the driver software of said Client unit over the bi-directional wireless communications connection;

receive from the external Master unit, using the application interface over the bi-directional wireless communications connection, a service object of the external Service Provider unit; and configure the service object of the external Service Provider unit to enable said Client unit to communicate via the application interface directly with the external Service Provider unit corresponding to the request for a service.

26. The system of claim 25, wherein said Client unit is configured to automatically establish the wireless bi-directional communications connection in response to location of the Client unit within a proximity of said external Master unit.

27. A method for providing wireless communications services, comprising:

establishing at a mobile Client unit a wireless bi-directional communications connection to an external Master unit;

transmitting driver software of the Client unit and a request for a service using the wireless bi-directional communications connection, thereby enabling the external Master unit to establish an application interface associated to the Client driver software and to associate the request for a service to an external Service Provider unit associated with the external Master unit and corresponding to the request for a service;

receiving at the Client unit a service object of the external Service Provider unit corresponding to the request for a service; and configuring the service object at the Client unit so as to enable the Client unit to communicate directly with the external Service Provider unit via the application interface over the wireless bi-directional communications connection.

28. The method of claim 27, further comprising:

establishing the wireless bi-directional communications connection in response to location of the Client unit within a proximity of the external Master unit.

29. A communications system comprising:

a Master unit including:

means for automatically establishing a wireless bi-directional communications connection between said Master unit and an external Client unit, means for receiving at the Master unit, using the wireless bi-directional communications connection, driver software of the external Client unit and a request for a service from the external Client unit, means for automatically, in response to receipt of the request for a service:

associating the request for a service with a Service Provider unit associated with the Master unit and corresponding to the request for a service, establishing between the Master unit and the external Client unit an application interface associated to the driver software of the external Client unit, over the wireless bi-directional communications connection, and transmitting a service object of the Service Provider unit to the external Client unit using the application interface over the wireless bi-directional communications connection.

* * * * *

UNITED STATES PATENT AND TRADEMARK OFFICE
CERTIFICATE OF CORRECTION

PATENT NO. : 7,664,885 B2
APPLICATION NO. : 10/363059
DATED : February 16, 2010
INVENTOR(S) : Carapelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 563 days.

Signed and Sealed this

Ninth Day of November, 2010

David J. Kappos
*Director of the United States Patent and Trademark Office*